(12) United States Patent
Been et al.

(10) Patent No.: US 12,217,396 B2
(45) Date of Patent: Feb. 4, 2025

(54) METHOD AND APPARATUS FOR RESTORING IMAGE OF FINGERPRINT SENSOR

(71) Applicant: SAMSUNG DISPLAY CO., LTD., Yongin-si (KR)

(72) Inventors: Kyoung Hun Been, Asan-si (KR); Mi Young Kim, Hwaseong-si (KR); Jin Woo Kim, Hwaseong-si (KR); Byeong Kyu Jeon, Busan (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 386 days.

(21) Appl. No.: 17/812,455

(22) Filed: Jul. 14, 2022

(65) Prior Publication Data

US 2023/0101088 A1    Mar. 30, 2023

(30) Foreign Application Priority Data

Sep. 28, 2021    (KR) .................. 10-2021-0127858

(51) Int. Cl.
*G06T 5/50*    (2006.01)
*G06V 40/13*    (2022.01)

(52) U.S. Cl.
CPC ............ *G06T 5/50* (2013.01); *G06V 40/1306* (2022.01)

(58) Field of Classification Search
CPC ................... G06T 5/50; G06V 40/1306

USPC ........................................................ 382/284
See application file for complete search history.

(56) References Cited

U.S. PATENT DOCUMENTS

| | | | |
|---|---|---|---|
| 9,633,269 B2* | 4/2017 | Gu ............ | G06V 40/1376 |
| 2017/0004347 A1 | 1/2017 | Agassy et al. | |
| 2020/0257875 A1* | 8/2020 | Hall ........... | G06V 40/1371 |
| 2021/0019488 A1* | 1/2021 | Chau .......... | G06V 40/1329 |
| 2021/0089747 A1* | 3/2021 | He ............. | G06V 40/1324 |
| 2021/0303811 A1* | 9/2021 | Chung ......... | G06V 40/1318 |
| 2022/0058357 A1* | 2/2022 | Xu ............. | G06V 40/1306 |

FOREIGN PATENT DOCUMENTS

KR    10-2021-0037783    4/2021

* cited by examiner

*Primary Examiner* — Allen H Nguyen
(74) *Attorney, Agent, or Firm* — F. CHAU & ASSOCIATES, LLC

(57) ABSTRACT

A method for restoring an image of a fingerprint sensor is described. The method includes capturing, by the fingerprint sensor, a fake fingerprint image from a fake fingerprint; calculating a phase of the fake fingerprint from the fake fingerprint image; capturing a plurality of target fingerprint images at measurement times by a fingerprint sensor disposed on a rear side of a display panel; applying the calculated phase to each of the acquired target fingerprint images; and combining information from each of the plurality of target fingerprint images to generate a final fingerprint image.

20 Claims, 12 Drawing Sheets

| IMAGE SYNTHESIS ORDER | | 1 | 2 | 3 | 4 | 5 |
|---|---|---|---|---|---|---|
| MEASUREMENT TIME | REGULAR | $t_i - 2 \cdot \Delta t$ | $t_i - \Delta t$ | $t_i$ | $t_i + \Delta t$ | $t_i + 2 \cdot \Delta t$ |
| | IRREGULAR | $t_i - 5 \cdot \Delta t$ | $t_i - 2 \cdot \Delta t$ | $t_i$ | $t_i + \Delta t$ | $t_i + 3 \cdot \Delta t$ |

METHOD AND APPARATUS FOR RESTORING IMAGE OF FINGERPRINT SENSOR

CROSS-REFERENCE TO RELATED APPLICATION

This application claims priority under 35 U.S.C. § 119 to Korean Patent Application No. 10-2021-0127858, filed on Sep. 28, 2021 in the Korean Intellectual Property Office, the disclosure of which is incorporated by reference herein in its entirety.

TECHNICAL FIELD

The present disclosure relates to a method for restoring an image of a fingerprint sensor and an apparatus for restoring an image of a fingerprint sensor.

DISCUSSION OF THE RELATED ART

Display devices are employed in a variety of electronic devices such as smart phones, tablet PCs, laptop computers, monitors and televisions. Recently, as mobile communications technology evolves, there has been increased use of portable electronic devices such as smartphones, tablet PCs and laptop computers.

To protect the data inside the portable electronic devices from unintended users, portable electronic devices have various forms of authentication. For example, some devices use an alphanumeric password or a numeric PIN to provide authentication for access and use of the device. Further, some devices utilize biometric information such as fingerprint authentication. To facilitate the fingerprint authentication, display devices may include a fingerprint sensor.

The fingerprint sensor may be implemented by using an optical scanner, an ultrasonic scanner, and/or a capacitive scanner. The fingerprint sensor may be disposed under the display panel of the display device, and there may be several elements disposed between the display panel and the fingerprint sensor. To scan the fingerprint, an incident signal transmitted from the fingerprint sensor is reflected off a user's fingerprint and is received back to the fingerprint sensor as a reflected signal.

SUMMARY

Aspects of the present disclosure provide a method for restoring an image of a fingerprint sensor that can derive a final fingerprint image by applying phase information obtained from a fake fingerprint image to target fingerprint images in a display device having a multi-layer structure.

Aspects of the present disclosure also provide an apparatus for restoring an image of a fingerprint sensor that can derive a final fingerprint image by applying phase information obtained from a fake fingerprint image to target fingerprint images in a display device having a multi-layer structure.

Objects of the present disclosure are not limited to the above-mentioned object; and other objects of the present disclosure will be apparent to those skilled in the art from the following descriptions.

The details of one or more embodiments of the subject matter described in this specification are set forth in the accompanying drawings and the description below.

According to example embodiments, a final fingerprint image can be derived by first capturing a fake fingerprint image in a display device having a multi-layer structure and calculating phase information from the fake fingerprint image.

According to an embodiment, a method for restoring an image of a fingerprint sensor, the method includes capturing, by the fingerprint sensor, a fake fingerprint image from a fake fingerprint; calculating a phase of the fake fingerprint from the fake fingerprint image; capturing a plurality of target fingerprint images at measurement times by a fingerprint sensor disposed on a rear side of a display panel; applying the calculated phase to each of the plurality of acquired target fingerprint images; and combining information from each of the plurality of target fingerprint images to generate a final fingerprint image.

According to another embodiment, an apparatus for restoring an image of a fingerprint sensor, includes an image acquiring unit configured to capture a fake fingerprint image from a fake fingerprint; a phase calculating unit configured to calculate a phase of the fake fingerprint from the fake fingerprint image; a target fingerprint image acquiring unit configured to acquire target fingerprint images at measurement times by a fingerprint sensor disposed on a rear side of a display panel; and a phase applying unit configured to apply the calculated phase to each of the acquired target fingerprint images.

Effects of the present disclosure are not limited to those described above, and other effects of the present disclosure will be apparent to those skilled in the art from the following description.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

Figure 1:
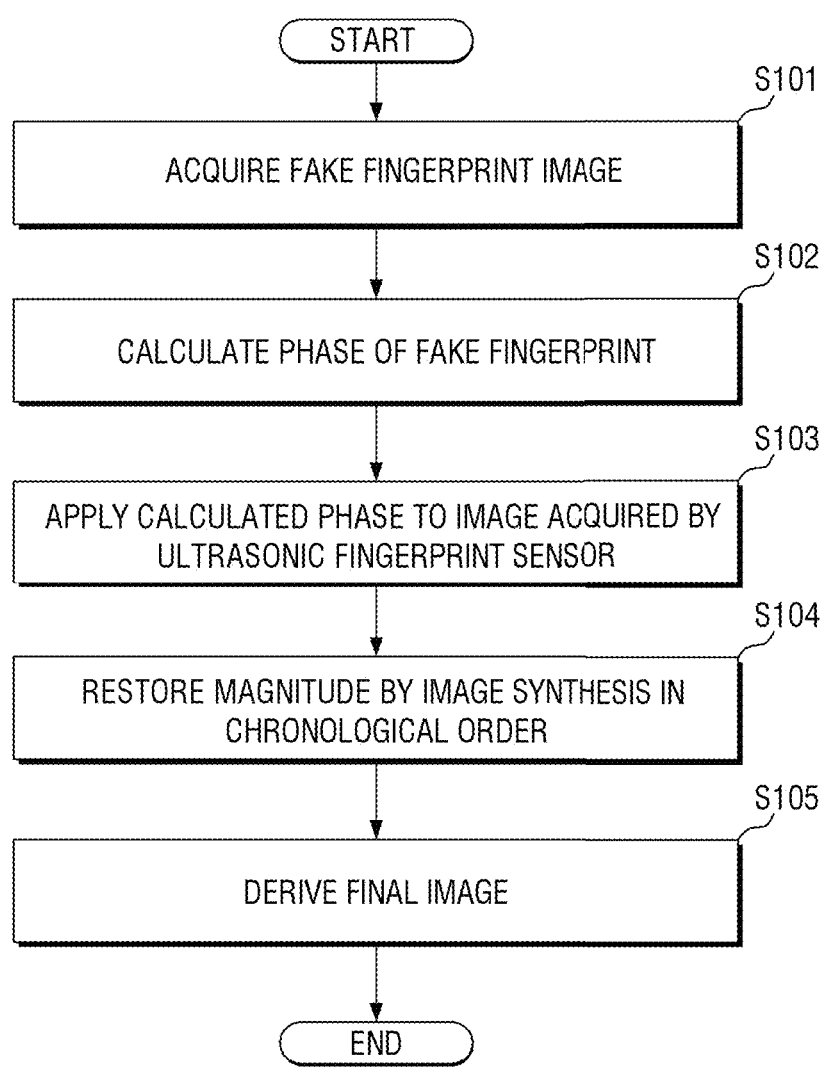
FIG. 1 is a flowchart that illustrates a method for restoring an image of a fingerprint sensor according to an example embodiment of the present disclosure.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention.

It will be understood that when an element is referred to as being related to another element such as being "coupled" or "connected" to another element, it can be directly coupled or connected to the other element, or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements may then be oriented on "upper" sides of the other elements. The example term "lower," can therefore, encompass both an orientation of "lower" and "upper," depending on the particular orientation of the figure. Similarly, if the device in one of the figures is turned over, elements described as "below" or "beneath" other elements may then be oriented "above" the other elements. The example terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, example embodiments of the present disclosure will be described in detail with reference to the accompanying drawings.

A fingerprint sensor may function by transmitting an ultrasonic signal and measuring the reflected ultrasonic signal.

The pattern image of the fingerprint sensor image acquired by an ultrasonic fingerprint sensor is changed depending on a measurement timing (e.g., timing between the transmission of the incident signal and reception of the reflected signal and/or times between the transmissions), due to diffraction, interference, etc. in the transmission path. The pattern image is changed because the magnitude and phase are lost over measurement times of the measurement timing and thus vary. In order to restore the changed pattern image, it is necessary to calculate the information of the phase depending on the ultrasound path (or distance).

For recognizing a fingerprint, the calculated phase information may be inaccurate or difficult to calculate because there are a variety of ultrasound transmission paths depending on the materials and the number of the layers in the display device. The embodiments described herein provide systems and methods for restoring a fingerprint image captured from a fingerprint sensor.

FIG. 1 is a flowchart that illustrates a method for restoring an image of a fingerprint sensor according to an example embodiment of the present disclosure.

Referring to FIG. 1, a method for restoring an image of a fingerprint sensor according to an example embodiment of the present disclosure may include: acquiring a fake fingerprint image (e.g., from a reference fingerprint structure) (step S101); calculating a phase of the fake fingerprint from the acquired fake fingerprint image (step S102); acquiring target fingerprint images at a measurement timing (e.g., at certain measurement times) by a fingerprint sensor disposed on a rear side of a display panel; applying an calculated phase to each of the acquired target fingerprint images (step S103); restoring magnitude by image synthesis in chronological order (S104); and deriving a final fingerprint image from the target fingerprint images to each of which the calculated phase has been applied (step S105).

The capturing of the final fingerprint image from the target fingerprint images to each of which the calculated phase has been applied may include synthesizing magnitudes of the target fingerprint images. In the capturing of the final fingerprint image from the target fingerprint images, the final fingerprint image may be generated by restoring magnitudes of the target fingerprint images The fingerprint sensor may include an ultrasonic fingerprint sensor.

There may be a polarization layer disposed on the display panel and a first coupling member between the polarization layer and the display panel.

Further, there may be a cover window disposed on the polarization layer, and a second coupling member between the cover window and the polarization layer.

Further, there may be a protective layer between the display panel and the fingerprint sensor, and a third coupling member between the protective layer and the display panel.

Further, there may be a metal plate between the protective layer and the fingerprint sensor, and a fourth coupling member between the metal plate and the protective layer.

The ultrasonic fingerprint sensor may compare an incident ultrasonic wave incident upward from the ultrasonic fingerprint sensor with a fingerprint reflected ultrasonic wave reflected from a fingerprint (e.g., from a finger) to recognize the fingerprint.

According to an example embodiment of the present disclosure, in the capturing of the target fingerprint images, multiple layers of the display device including the display panel may be disposed between the ultrasonic fingerprint sensor and the target fingerprint (or fingerprint).

Hereinafter, a structure of the display device including the ultrasonic fingerprint sensor will be described in detail.

Figure 2:
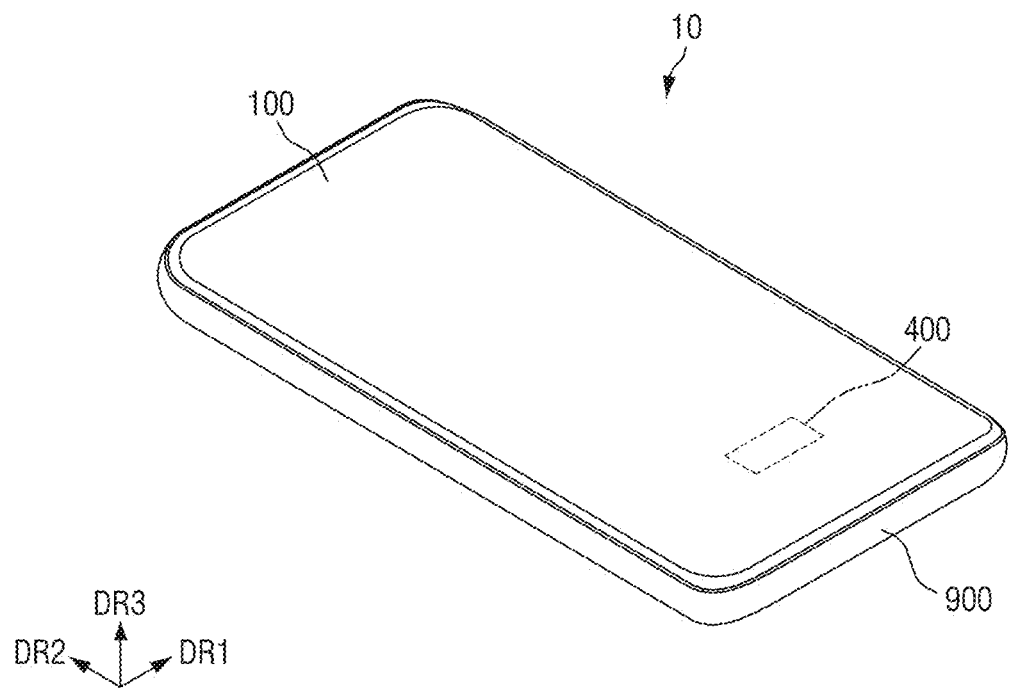
FIG. 2 is a perspective view of a display device with an ultrasonic fingerprint sensor attached thereto, as referenced in a method of restoring an image of a fingerprint sensor according to an example embodiment.
Figure 3:
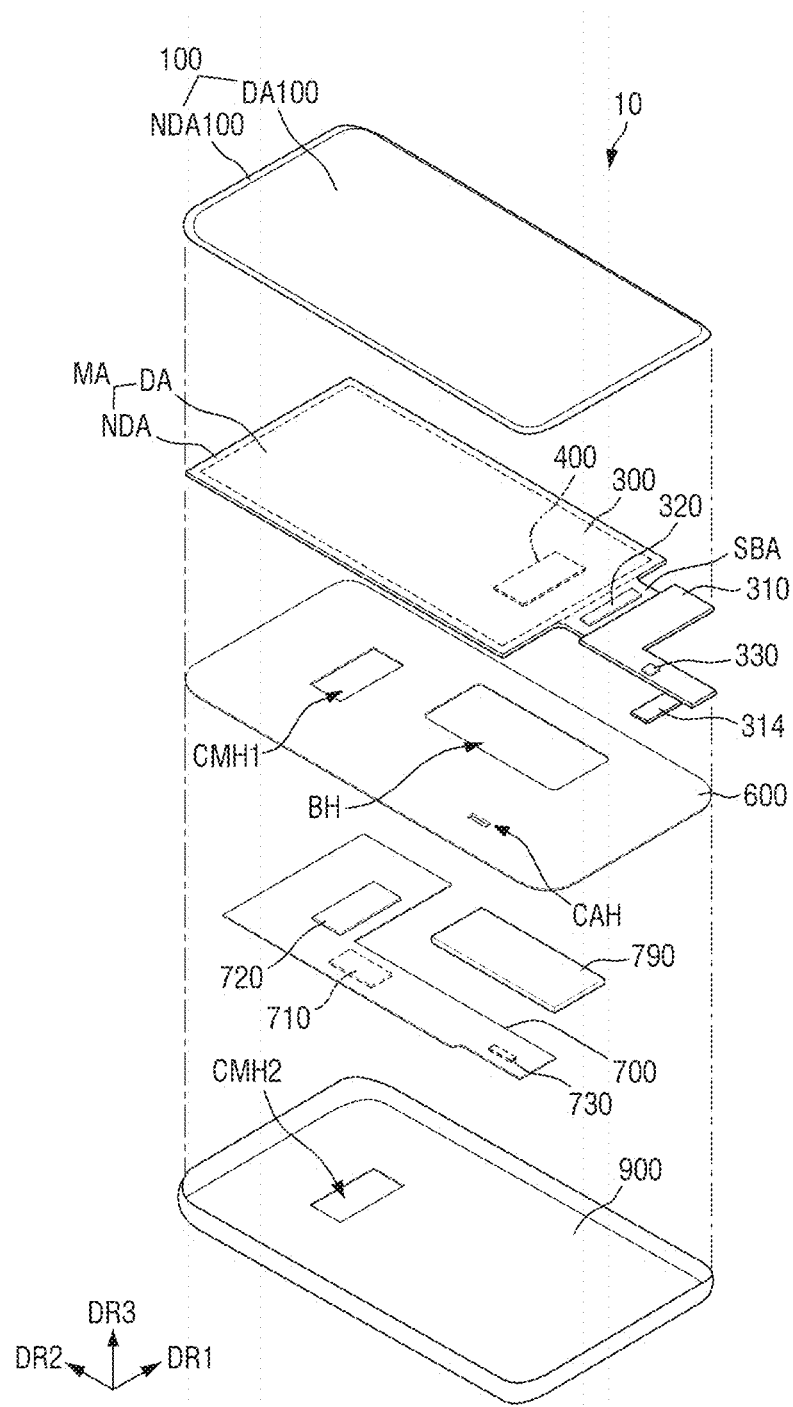
FIG. 3 is an exploded, perspective view of a display device according to an example embodiment of the present disclosure.

FIG. 2 is a perspective view that shows a display device according to an example embodiment of the present disclosure. FIG. 3 is an exploded, perspective view of a display device according to an example embodiment of the present disclosure.

Referring to FIGS. 2 and 3, a display device 10 according to an example embodiment of the present disclosure may be employed by portable electronic devices such as by a mobile phone, a smart phone, a tablet PC, a mobile communications terminal, an electronic notebook, an electronic book, a portable multimedia player (PMP), a navigation device, and/or a ultra mobile PC (UMPC). In some examples, the display device 10 according to an example embodiment of the present disclosure may be used as a display unit of a television, a laptop computer, a monitor, an electronic billboard, or a device of the Internet of Things (JOT). In some examples, the display device 10 according to the example embodiment of the present disclosure may be applied to wearable devices such as a smart watch, a watch phone, a glasses-type display, and a head-mounted display (HMD) device. In some examples, the display device 10 according to the example embodiment may be used as a center information display (CID) disposed at the instrument cluster, the center fascia or the dashboard of a vehicle, as a room mirror display such as on the side mirrors of a vehicle, and/or as a display placed on the back of each of the front seats that is an entertainment system for passengers at the rear seats of a vehicle.

As used herein, a first direction DR1 may refer to the direction in which the shorter sides of the display device 10 are extended, for example, the horizontal direction of the display device 10. A second direction DR2 may refer to the direction in which the longer sides of the display device 10 are extended, for example, the vertical direction of the display device 10. A third direction DR3 may refer to the thickness direction of the display device 10.

The display device 10 may have a shape that is similar to a quadrangular shape when viewed from the top. For example, the display device 10 may have a shape similar to a quadrangular shape with shorter sides in the first direction DR1 and longer sides in the second direction DR2 when viewed from the top as shown in FIG. 1. The corners where the shorter sides in the first direction DR1 meet the longer sides in the second direction DR2 may be rounded with a predetermined curvature, or may be a right angle. The shape of the display device 10 when viewed from the top is not limited to a quadrangular shape, but may be formed in various shapes such as polygonal shapes, a circular shape, or an elliptical shape.

The display device 10 may be formed to be flat. Alternatively, the display device 10 may be formed so that two sides facing each other are bent. For example, the display device 10 may be formed so that left and right sides are bent. In these cases, the display device may have a display panel that is curved around the edges of the device, and/or may be foldable along an axis or line. In some cases, the display device 10 may be formed so that all of the upper side, the lower side, the left side and the right side are bent.

The display device 10 according to an example embodiment of the present disclosure includes a cover window 100, a display panel 300, a display circuit board 310, a display driver circuit 320, a fingerprint sensor 400, a bracket 600, a main circuit board 700, and a bottom cover 900.

The cover window 100 may be disposed on the display panel 300 to cover the front surface of the display panel 300. In this way, the cover window 100 can protect the upper surface of the display panel 300.

The cover window 100 may include a transmissive area DA100 corresponding to the display panel 300 and a non-transmissive area NDA 100. The non-transmissive area NDA 100 may correspond to a non-display area which surrounds the display panel 300 in a plan view. The non-transmissive area NDA 100 may be opaque. In some examples, the non-transmissive area NDA 100 may be formed as a decoration layer having a pattern that can be displayed to a user when no image is displayed.

The display panel 300 may be disposed under the cover window 100. The display panel 300 may be a light-emitting display panel including light-emitting elements. For example, the display panel 300 may be an organic light-emitting display panel using an organic light-emitting diode in an organic light-emitting layer. The display panel 300 is not necessarily limited thereto, and may, for example, include a backlight layer separate from a color filter layer.

The display panel 300 may include the main area MA and a subsidiary area SBA.

The main area MA may include a display area DA where images are displayed and a non-display area NDA around the display area DA. The display area DA may include display pixels SP (see FIG. 3) for displaying images. The non-display area NDA may be defined as the area that extends from outer sides of the display area DA to the edge of the display panel 300.

The display area DA may include a fingerprint sensing area. The fingerprint sensing area refers to an area where the fingerprint sensor 400 is disposed. The fingerprint sensing area may be a part of the display area DA as shown in FIG. 2. The fingerprint sensor 400 may include, for example, an optical fingerprint sensor, an ultrasonic fingerprint sensor, or a capacitive fingerprint sensor. In the following description, an ultrasonic fingerprint sensor is employed as the fingerprint sensor 400.

The shape of the main area MA of the display panel 300 may be rectangular. For example, the shape of the main area MA when viewed from the top may have a rectangular shape having all corners forming a right angle. It should be understood, however, that the present disclosure is not limited thereto. The shape of the main area MA when viewed from the top (e.g., from a plan view) may be a rectangle with rounded corners.

The subsidiary area SBA may protrude from one side of the main area MA in the second direction DR2. The length of the subsidiary area SBA in the first direction DR1 may be less than the length of the main area MA in the first direction DR1. The length of the subsidiary area SBA in the second direction DR2 may be smaller less the length of the main area MA in the second direction DR2. In other embodiments, the dimensions of the subsidiary area SBA are not so limited, however.

Although the subsidiary area SBA is unfolded in the example shown in FIG. 3, the subsidiary area SBA may be bent and may be disposed on the lower surface of the display panel 300. For example, the subsidiary area may be bent around an edge of the main area MA. When the subsidiary area SBA is bent, it may overlap the main area MA in the thickness direction DR3 of the substrate SUB. The display circuit board 310 and the display driver circuit 320 may be disposed in the subsidiary area SBA.

The display circuit board 310 may be attached to one end of the subsidiary area SBA of the display panel 100 using a conductive adhesive member such as an anisotropic conductive film. Accordingly, the display circuit board 310 may be electrically connected to the display panel 300 and the display driver circuit 320. The display panel 300 and the display driver circuit 320 may receive digital video data, timing signals, and driving voltages through the display circuit board 310. The display circuit board 310 may be a flexible printed circuit board, a printed circuit board, or a flexible film such as a chip on film.

The display driver circuit 320 may generate signals and voltages for driving the display panel 300. The display driver circuit 320 may be implemented as an integrated circuit (IC) and may be attached to the subsidiary area SBA of the display panel 300 by a chip on glass (COG) technique, a chip on plastic (COP) technique, or an ultrasonic bonding. It should be understood that the present disclosure is not limited thereto. For example, the display driver circuit 320 may be attached on the display circuit board 310 by the chip-on-film (COF) technique.

A touch driver circuit 330 may be disposed on the display circuit board 310. The touch driver circuit 330 may be implemented as an integrated circuit and may be attached to the upper surface of the display circuit board 310.

A power supply for supplying display driving voltages for driving the display driving circuit 320 may be further disposed on the display circuit board 310.

The fingerprint sensor 400 may be disposed on a lower surface of the display panel 300. For example, the fingerprint sensor 400 may be disposed on a side of the display panel 300 that is adjacent to the subsidiary area SBA. The fingerprint sensor 400 may be attached on the lower surface of the display panel 300 using a fifth coupling member to be described later.

The bracket 600 may be disposed under the display panel 300. The bracket 600 may include plastic, metal, or both plastic and metal. In the bracket 600, a first camera hole CMH1 in which a first camera sensor 720 is inserted, a battery hole BH in which a battery is disposed, and a cable hole CAH through which a cable 314 connected to the display circuit board 310 passes is also disposed.

The main circuit board 700 and the battery 790 may be disposed under the bracket 600. The main circuit board 700 may be a printed circuit board and/or a flexible printed circuit board.

The main circuit board 700 may include a main processor 710, a first camera sensor 720, and a main connector 730. The first camera sensor 720 may be disposed on both the upper and lower surfaces of the main circuit board 700, the main processor 710 may be disposed on the upper surface of the main circuit board 700, and the main connector 730 may be disposed on the lower surface of the main circuit board 700.

The main processor 710 may control functions of the display device 10. For example, the main processor 710 may output digital video data to the display driver circuit 320 through the display circuit board 310 so that the display panel 300 displays images. In addition, the main processor 710 may receive touch data from the touch driver circuit 330 to determine the coordinates of a user's touch, and then may execute an application indicated by the icon displayed at the coordinates of the user's touch, or interact with an open application based on the user's touch. In addition, the main processor 710 may convert the first image data input from the first camera sensor 720 into digital video data and may output it to the display driver circuit 320 through the display circuit board 310, so that the image captured by the first camera sensor 720 may be displayed on the display panel 300.

The first camera sensor 720 may process image frames such as still images and video obtained by an image sensor and may output them to the main processor 710. The first camera sensor 720 may be a CMOS image sensor or a CCD sensor. The first camera sensor 720 may be exposed to the lower surface of the bottom cover 900 through the second camera hole CMH2, and thus may capture an object or a background under the display device 10. For example, a lens affixed to and providing an optical path to the first camera sensor 720 may be exposed to the lower surface of the bottom cover 900 through the second camera hole CMH2.

The cable 314, once passed through the cable hole CAH of the bracket 60, may be connected to main connector 730. Accordingly, the main circuit board 700 may be electrically connected to the display circuit board 310.

The battery 790 may be disposed so that it does not overlap the main circuit board 700 in the third direction DR3. The battery 790 may overlap with the battery hole BH of the bracket 600. In some embodiments, the fingerprint sensor 400 overlaps with the battery hole BH of the bracket 600 as well.

In some embodiments, a mobile communications module capable of transmitting/receiving a radio signal to/from at least one of a base station, an external terminal and a server over a mobile communications network is further mounted on the main circuit board 700. The wireless signal may include various types of data depending on a voice signal, a video call signal, or a text/multimedia message transmission/reception.

The bottom cover 900 may be disposed under the main circuit board 700 and the battery 790. The bottom cover 900 may be fastened and fixed to the bracket 600. The bottom cover 900 may form the exterior of the lower surface of the display device 10. The bottom cover 900 may include plastic, metal or plastic and metal.

A second camera hole CMH2 may be formed in the bottom cover 900, through which the lower surface of the first camera sensor 720 is exposed. The position of the first camera sensor 720 and the positions of the first and second camera holes CMH1 and CMH2 in line with the first camera sensor 720 are not limited to those according to the example embodiment shown in FIG. 2.

Figure 4:
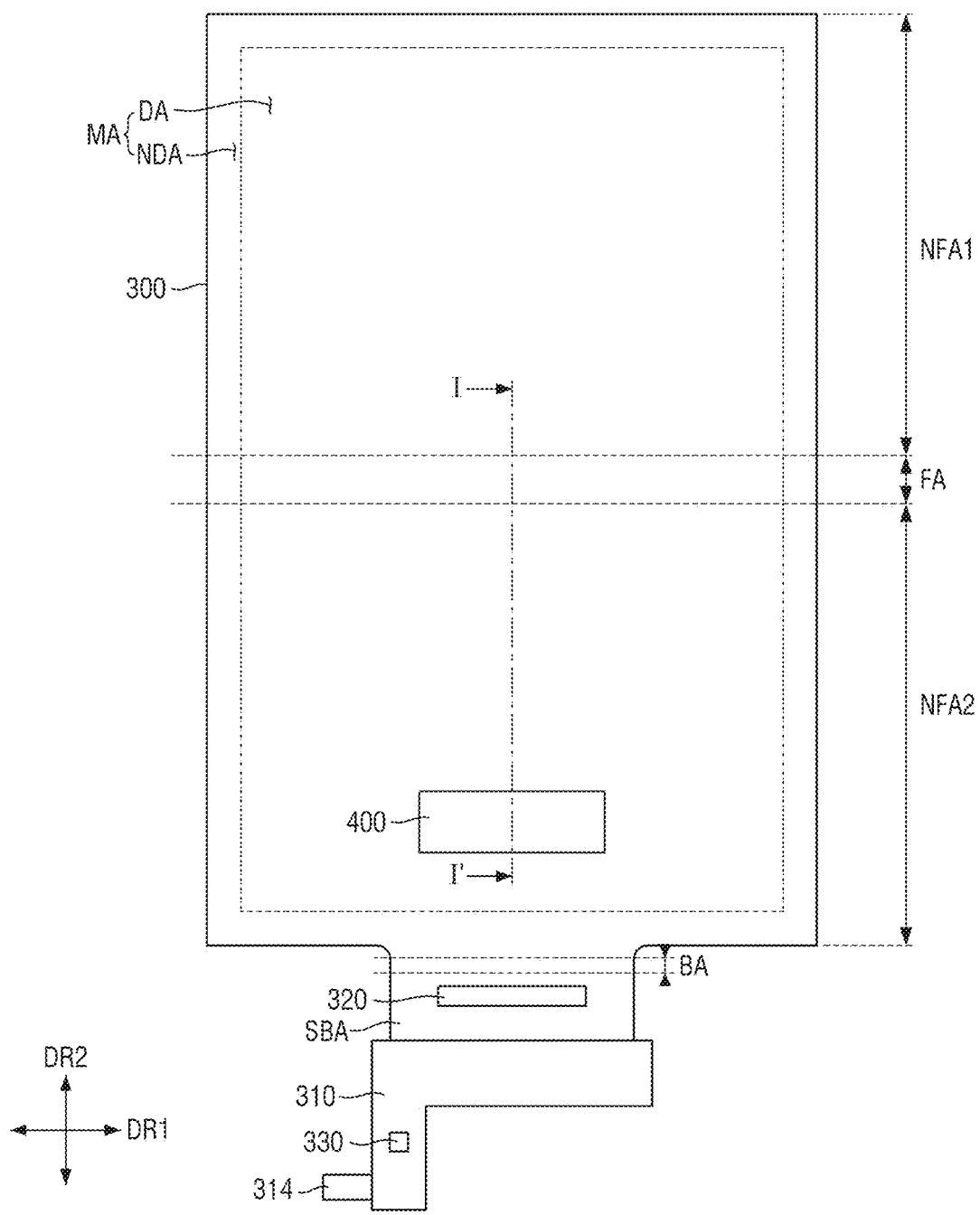
FIG. 4 is a plan view that shows a display panel, a display circuit board and a display driver circuit of FIG. 3.

FIG. 4 is a plan view that shows a display panel, a display circuit board and a display driver circuit of FIG. 3.

Referring to FIG. 4, a folding area FA and non-folding areas NFA1 and NFA2 may be further defined in the display device. The folding area FA may have a line shape and may extend in the first direction DR1. The first non-folding area NFA1 may be located on one side of the folding area FA in the second direction DR2, while the second non-folding area NFA2 may be located on the opposite side of the folding area FR in the second direction DR2. The area of each of the non-folding areas NFA1 and NFA2 may be greater than the area of the folding area FA, but the present disclosure is not limited thereto.

The display device may be a foldable display that can be folded and unfolded at the folding area FA while the non-folding areas NFA1 and NFA2 are unfolded. For example, in the folded state, the display device 300 may have a nonzero radius of curvature in the folding area FA. The display device is an in-foldable display device that folds inward such that the upper surface of the first non-folding area NFA1 and the upper surface of the second non-folding area NFA2 of the display device face each other around the folding area FA. In some embodiments, the display device is an out-foldable display device that folds outward such that the lower surface of the first non-folding area NFA1 and the lower surface of the second non-folding area NFA2 of the display device face each other around the folding area FA.

The fingerprint sensor 400 may be disposed in the second non-folding area NFA2 as shown in FIG. 3. It should be understood, however, that the present disclosure is not limited thereto. The fingerprint sensor 400 may be disposed in the first non-folding area NFA1 or in the folding area FA.

Figure 5:
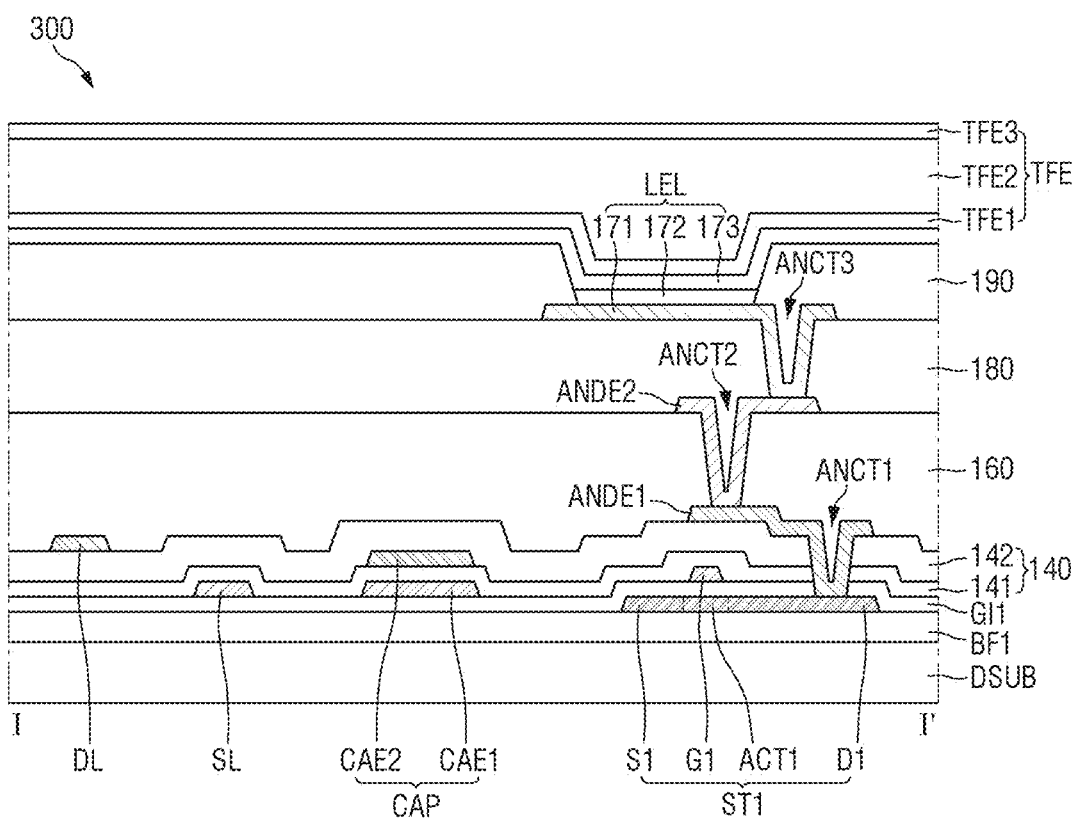
FIG. 5 is a cross-sectional view that shows an example of the display panel of FIG. 4.

FIG. 5 is a cross-sectional view that shows an example of the display panel of FIG. 4.

Referring to FIG. 5, the display panel 300 may include display pixels capable of displaying images. Each of the display pixels SP may include a light-emitting element LEL, a first thin-film transistor ST1, and a capacitor CAP.

A display substrate DSUB may be made of an insulating material such as glass and a polymer resin. For example, the display substrate DSUB may include polyimide. The display substrate DSUB may be a flexible substrate that can be bent, folded, or rolled (e.g., without damaging the device).

The display substrate DSUB may include, for example, a plurality of organic layers and a plurality of inorganic layers. For example, the display substrate DSUB may include a first organic layer, a first barrier layer disposed on the first organic layer and including at least one inorganic layer, a second organic layer disposed on the first barrier layer, and a second barrier layer disposed on the second organic layer and including at least one inorganic layer.

A first buffer film BF1 may be disposed on the display substrate DSUB. The first buffer film BF1 can protect thin-film transistors of a thin-film transistor layer TFTL and protect an emissive layer 172 of the emission material layer EML from moisture permeating through the display substrate DSUB, which is vulnerable to moisture permeation without the first buffer film BF1. The first buffer film BF1 may be made up of multiple inorganic films alternately stacked on one another. For example, the first buffer film BF1 may be made up of multiple films in which one or more inorganic films including a silicon nitride layer, a silicon oxynitride layer, a silicon oxide layer, a titanium oxide layer and an aluminum oxide layer are alternately stacked on one another.

A first active layer ACT1, a first source electrode S1 and a first drain electrode D1 of the first thin-film transistor ST1 may be disposed on the first buffer film BF1. The first active layer ACT1 of the first thin-film transistor ST1 includes a semiconductor, such as a polycrystalline silicon, monocrystalline silicon, low-temperature polycrystalline silicon, amorphous silicon, or oxide semiconductor. The first source electrode S1 and the first drain electrode D1 may have conductivity as a result of doping a silicon semiconductor or an oxide semiconductor with ions or impurities. The first active layer ACT1 may overlap a first gate electrode G1 in the third direction DR3, which is the thickness direction of the display substrate DSUB, and the first source electrode S1 and the first drain electrode D1 might not overlap the first gate electrode G1 in the third direction DR3.

The first gate insulating layer GI1 may be disposed on the first active layer ACT1 of the first thin film transistor ST1. The first gate insulating layer GI1 may be include an inorganic layer, for example, a silicon nitride layer, a silicon oxynitride layer, a silicon oxide layer, a titanium oxide layer, or an aluminum oxide layer.

The first gate electrode G1 of the first thin-film transistor ST1, a first capacitor electrode CAE1 and a scan line SL may be disposed on the first gate insulating film GI1. The first gate electrode G1 may overlap the first active layer ACT1 in the third direction DR3. The scan line SL may be electrically connected to the first gate electrode G1. The first capacitor electrode CAE1 may overlap the second capacitor electrode CAE2 in the third direction DR3. The first gate electrode G1 and the scan line SL may each be a single layer or may include multiple layers including molybdenum (Mo), aluminum (Al), chromium (Cr), gold (Au), titanium (Ti), nickel (Ni), neodymium (Nd) and copper (Cu) or an alloy thereof.

The first interlayer dielectric layer 141 may be disposed on the first gate electrode G1 and the first capacitor electrode CAE1. The first interlayer dielectric layer 141 may be an inorganic layer, for example, a silicon nitride layer, a silicon oxynitride layer, a silicon oxide layer, a titanium oxide layer, or an aluminum oxide layer.

The second capacitor electrode CAE2 may be disposed on the first interlayer dielectric layer 141. Since the first interlayer dielectric film 141 has a predetermined dielectric constant, the capacitor CAP can be formed by the first capacitor electrode CAE1, the second capacitor electrode CAE2, and the first interlayer dielectric layer 141 disposed between the first capacitor electrode CAE1 and the second capacitor electrode CAE2. The second capacitor electrode CAE2 may be a single layer or may include multiple layers including molybdenum (Mo), aluminum (Al), chromium (Cr), gold (Au), titanium (Ti), nickel (Ni), neodymium (Nd) and copper (Cu) or an alloy thereof.

A second interlayer dielectric layer 142 may be disposed over the second capacitor electrode CAE2. The second interlayer dielectric layer 142 may be an inorganic layer, for example, a silicon nitride layer, a silicon oxynitride layer, a silicon oxide layer, a titanium oxide layer, or an aluminum oxide layer. The second interlayer dielectric layer 142 may include multiple inorganic layers.

A first pixel connection electrode ANDE1 and a data line DL may be disposed on the second interlayer dielectric film 142. The first pixel connection electrode ANDE1 may be connected to a first drain electrode D1 of the first thin-film transistor ST1 through a first pixel contact hole ANCT1. The first pixel contact hole ANCT1 penetrates the first interlayer dielectric film 141 and the second interlayer dielectric film 142 to expose the first drain electrode D1 of the first thin-film transistor ST1. The first pixel connection electrode ANDE1 may be made up of a single layer or multiple layers including molybdenum (Mo), aluminum (Al), chromium (Cr), gold (Au), titanium (Ti), nickel (Ni), neodymium (Nd) and copper (Cu) or an alloy thereof.

A first organic film 160 may be disposed on the first pixel connection electrode ANDE1. For example, the first organic film 160 may be disposed on the first pixel connection electrode ANDE1 for planarization. The first organic film 160 may be formed of an acryl resin, an epoxy resin, a phenolic resin, a polyamide resin, a polyimide resin, etc.

A second pixel connection electrode ANDE2 may be disposed on the first organic film 160. The second pixel connection electrode ANDE2 may be connected to the first pixel connection electrode ANDE1 through a second pixel contact hole ANCT2 that penetrates through the first organic film 160 to expose the first pixel connection electrode ANDE1. The second pixel connection electrode ANDE2 may be made up of a single layer or multiple layers including molybdenum (Mo), aluminum (Al), chromium (Cr), gold (Au), titanium (Ti), nickel (Ni), neodymium (Nd) and copper (Cu) or an alloy thereof.

A second organic film 180 may be disposed on the second pixel connection electrode ANDE2. The second organic film 180 may be formed of an acryl resin, an epoxy resin, a phenolic resin, a polyamide resin, a polyimide resin, etc.

In an example embodiment of the present disclosure, the second pixel connection electrode ANDE2 and the second organic film 180 may be omitted. In this instance, the first pixel connection electrode ANDE1 may be connected directly to the light-emitting pixel electrode 171.

In FIG. 5, the first thin-film transistor ST1 is implemented as a top-gate transistor in which the first gate electrode G1 is located above the first active layer ACT1. However, the present disclosure is not limited thereto. For example, the first thin-film transistor ST1 may be implemented as a bottom-gate transistor in which the first gate electrode G1 is located below the first active layer ACT1, or as a double-gate transistor in which the first gate electrodes G1 are disposed above and below the first active layer ACT1.

The light-emitting elements LEL and a bank 190 may be disposed on the second organic film 180. Each of the light-emitting elements LEL includes a light-emitting pixel electrode 171, an emissive layer 172, and a light-emitting common electrode 173.

The light-emitting pixel electrode 171 may be formed on the second organic film 180. The light-emitting pixel electrode 171 may be connected to the second pixel connection electrode ANDE2 through a third pixel contact hole ANCT3 that penetrates through the second organic film 180 to expose the second pixel connection electrode ANDE2.

In the top-emission structure in which light exits from the emissive layer 172 toward the light-emitting common electrode 173, the light-emitting pixel electrode 171 may be made of a metal material having a high reflectivity such as a stack structure of aluminum and titanium (Ti/Al/Ti), a stack structure of aluminum and ITO (ITO/Al/ITO), an APC alloy, and/or a stack structure of APC alloy and ITO (ITO/APC/ITO). The APC alloy is an alloy of silver (Ag), palladium (Pd) and copper (Cu).

The bank 190 may partition the light-emitting pixel electrode 171 on the second organic film 180 to define an emission area EA. The bank 190 may cover the edge of the light-emitting pixel electrode 171. The bank 190 may be formed of an organic layer such as an acryl resin, an epoxy resin, a phenolic resin, a polyamide resin and a polyimide resin.

In the emission area EA, the light-emitting pixel electrode 171, the emissive layer 172 and the light-emitting common electrode 173 are stacked on one another sequentially, so that holes (e.g., absences of electrons) from the light-emitting pixel electrode 171 and electrons from the light-emitting common electrode 173 are combined with each other in the emissive layer 172 to emit light.

The emissive layer 172 is formed on the light-emitting pixel electrode 171 and the bank 190. The emissive layer 172 may include an organic material to emit light of a certain color. For example, the emissive layer 172 may include a hole transporting layer, an organic material layer, and an electron transporting layer.

The light-emitting common electrode 173 is formed on the emissive layer 172. The light-emitting common electrode 173 may cover the emissive layer 172. The light-emitting common electrode 173 may be a common layer formed across all of the emission areas EA; e.g., each of the emission areas EA may share the light-emitting common electrode 173. A capping layer may be formed on the light-emitting common electrode 173.

In the top-emission structure, the light-emitting common electrode 173 may be formed of a transparent conductive oxide (SCE) such as indium tin oxide (ITO) and/or indium zinc oxide (IZO) that can transmit light, or a semi-transmissive conductive material such as magnesium (Mg), silver (Ag) and an alloy of magnesium (Mg) and silver (Ag).

An encapsulation layer TFE may be disposed on the light-emitting common electrode 173. The encapsulation layer TFE includes at least one inorganic layer to prevent permeation of oxygen or moisture into the light-emitting element layer EML. In addition, the encapsulation layer TFE includes at least one organic layer to protect the light-emitting element layer EML from foreign substances such as dust. For example, the encapsulation layer TFE includes a first inorganic encapsulation film TFE1, an organic encapsulation film TFE2, and a second inorganic encapsulation layer TFE3.

According to the example embodiment of the present disclosure, the display panel 300 is an organic light-emitting display panel using organic light-emitting diodes, but the present disclosure is not limited thereto. The display panel 300 may be a micro light-emitting diode display panel using micro LEDs, a quantum-dot light-emitting display panel using quantum-dot light-emitting diodes and including a quantum-dot emissive layer, or an inorganic light-emitting display panel using inorganic light-emitting elements including an inorganic semiconductor.

Figure 6:
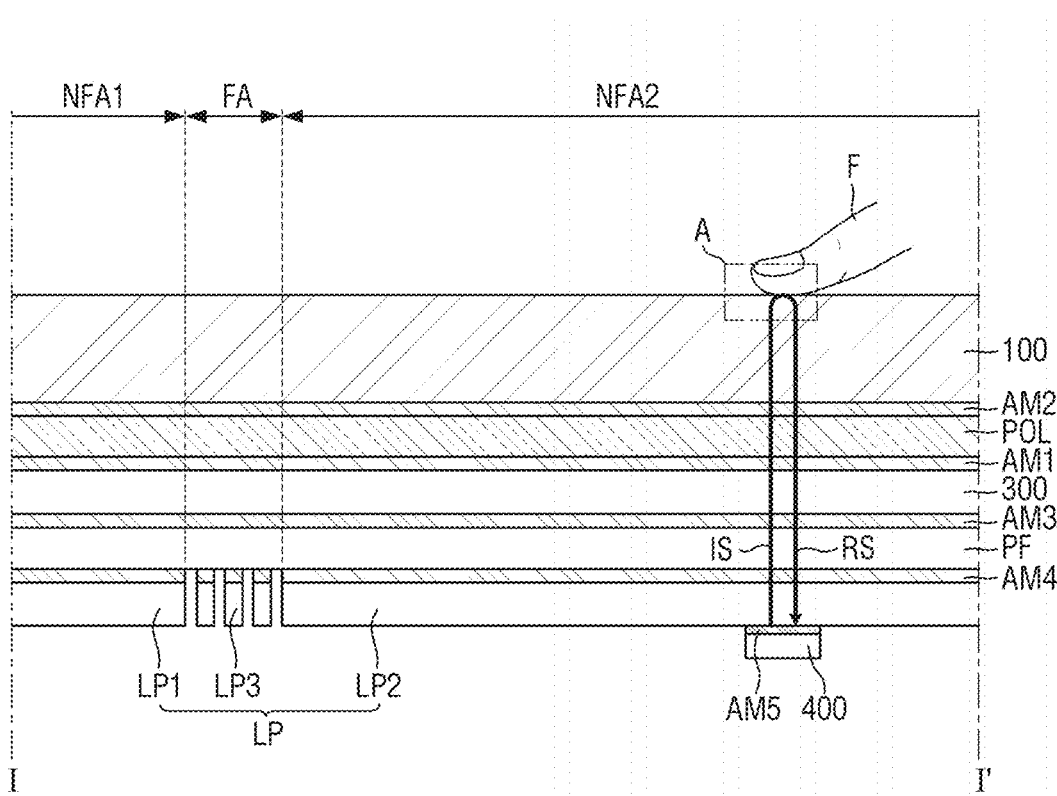
FIG. 6 is a cross-sectional view taken along line I-I' of FIG. 4.
Figure 7:
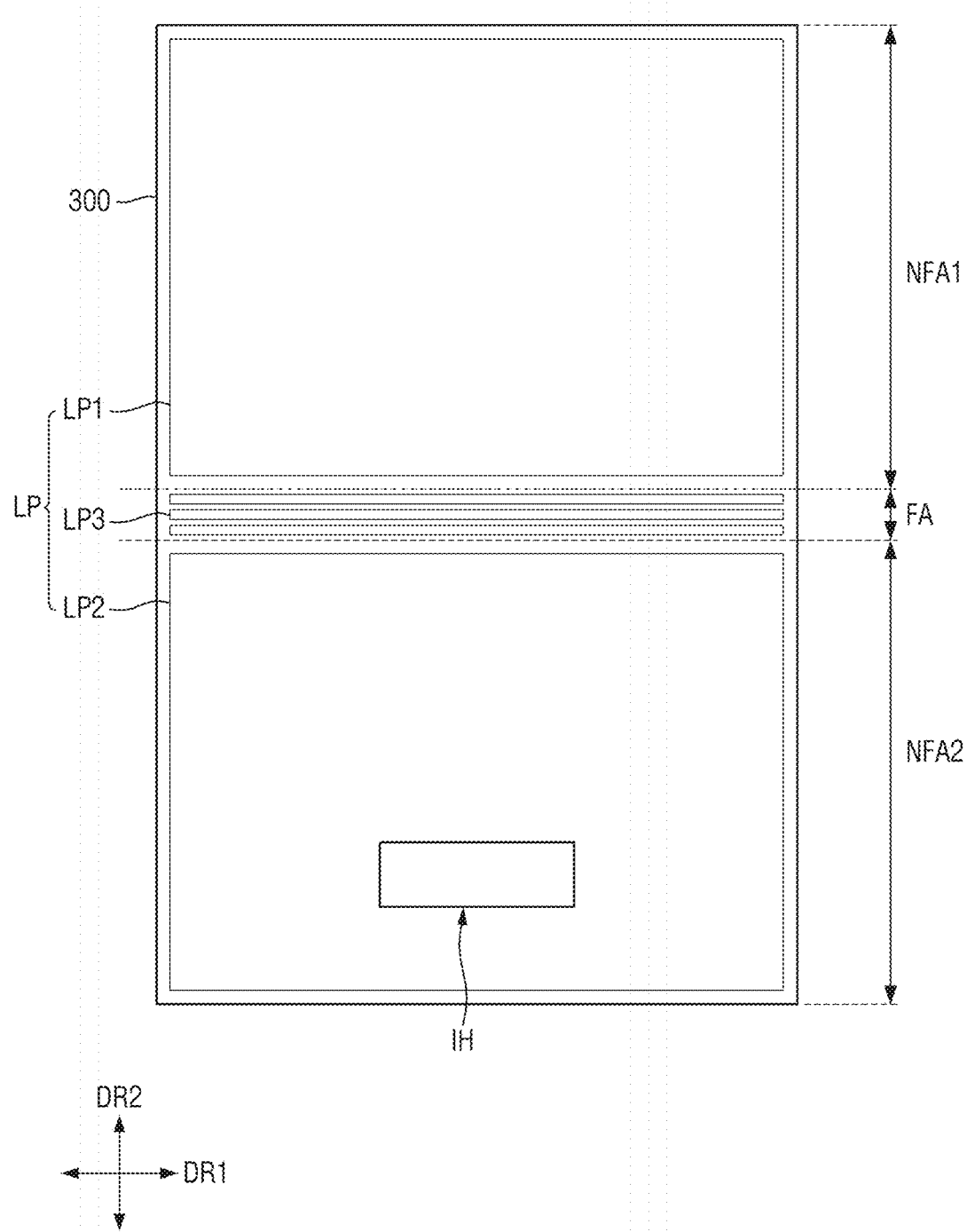
FIG. 7 is a plan view that shows a metal bottom sheet according to an example embodiment of the present disclosure.

FIG. 6 is a cross-sectional view taken along line I-I' of FIG. 4. FIG. 7 is a plan view that shows a metal bottom sheet according to an example embodiment of the present disclosure. FIG. 6 shows an example where a user has touched on the upper surface of the cover window 100 with her/his finger F for fingerprint recognition.

Referring to FIG. 6, the display device may include a polarization layer POL, a cover window 100, a metal plate LP, and coupling members AM1 to AM5 coupling between adjacent members. Among the coupling members AM1 to AM5, the first to fourth coupling members AM1 to AM4 may be pressure sensitive adhesives (PSA), and the fifth coupling member AM5 may be a transparent adhesive resin such as an optically clear resin (OCR) and/or an optically clear adhesive (OCA). It should be understood, however, that the present disclosure is not limited thereto. For example, the first to fourth coupling members AM1 to AM4 may be selected from between an optically clear resin (OCR) and an optically clear adhesive (OCA), and the fifth coupling member AM5 may be a pressure sensitive adhesive (PSA), or an optically clear adhesive (OCA) or a colored adhesive resin.

The polarization layer POL may be disposed above the display panel 300. The polarization layer POL may be attached to the upper surface of the display panel 300 through the first coupling member AM1. The polarization layer POL reduces reflection of external light incident on the cover window 100.

The cover window 100 may be disposed on the upper surface of the polarization layer POL. The cover window 100 may be attached to the upper surface of the polarization layer POL through the second coupling member AM2. In some implementations, the polarization layer POL may be eliminated. In these cases, color filters and a black matrix disposed between adjacent color filters may be disposed between the cover window 100 and the display panel 300.

A protective layer PF may be disposed on the lower surface of the display panel 300. The protective layer PF may include, but is not limited to, polyimide (PI) or polyethylene terephthalate (PET). The protective layer PF may be attached to the lower surface of the display panel 300 through the third coupling member AM3.

When the display panel 300 according to an example embodiment is a top-emission display panel, the light transmittance of the third coupling member AM3 may be lower than the light transmittance of the first and second coupling members AM1 and AM2 described above. It should be understood, however, that the present disclosure is not limited thereto.

The metal plate LP may be disposed under the protective layer PF. The metal plate LP may be attached to the lower surface of the protective layer PF through the fourth coupling member AM4. As shown in FIG. 7, the metal plate LP may include a first metal plate LP1 disposed in the first non-folding area NFA1, a second metal plate LP2 disposed in the second non-folding area NFA2, and a third metal plate LP3 which includes a plurality of patterns disposed in the folding area FA. The first and second metal plates LP1 and LP2 serve to support the display panel 300 above them in the non-folding areas NFA1 and NFA2, respectively. Each of the first and second metal plates LP1 and LP2 may have a cylindrical pattern shape. The metal plate LP may be made of a metal or a metal alloy. For example, the metal plate LP may be made of, but is not limited to, an aluminum alloy (e.g., SUS). In some example embodiments, the third metal plate LP3 may be eliminated. The first to third metal plates LP1, LP2 and LP3 are spaced apart from one another in the example shown in the drawings, but the present disclosure is not limited thereto. The first to third metal plates LP1, LP2 and LP3 may be formed integrally with one another.

The fingerprint sensor 400 may be coupled to the lower surface of the second metal plate LP2 through the fifth coupling member AM5.

As shown in FIG. 6, the finger F may include a fingerprint with a surface facing the cover window 100. The fingerprint of the finger F may include depressions and elevations on the surface. The depressions and elevations may be repeatedly arranged. Among the repeated depressions and elevations, in at least one section including one elevation and one depression, the elevation will be referred to as a ridge RID of the fingerprint, while the depression will be referred to as a valley VAL of the fingerprint. The ridges RID of the fingerprint may be located closer to the cover window 100 than the valleys VAL of the fingerprint. The operation of the ultrasonic fingerprint sensor will be described in detail with reference to FIG. 8.

In some example embodiments, there may be further layers separate from each other that are disposed between the metal plate LP and the protective layer PF. The layers include at least one functional layer. The functional layer may perform a heat dissipation function, an electromagnetic wave shielding function, a grounding function, a buffering function, a strength enhancing function, a supporting function, a digitizing function, etc.

Figure 8:
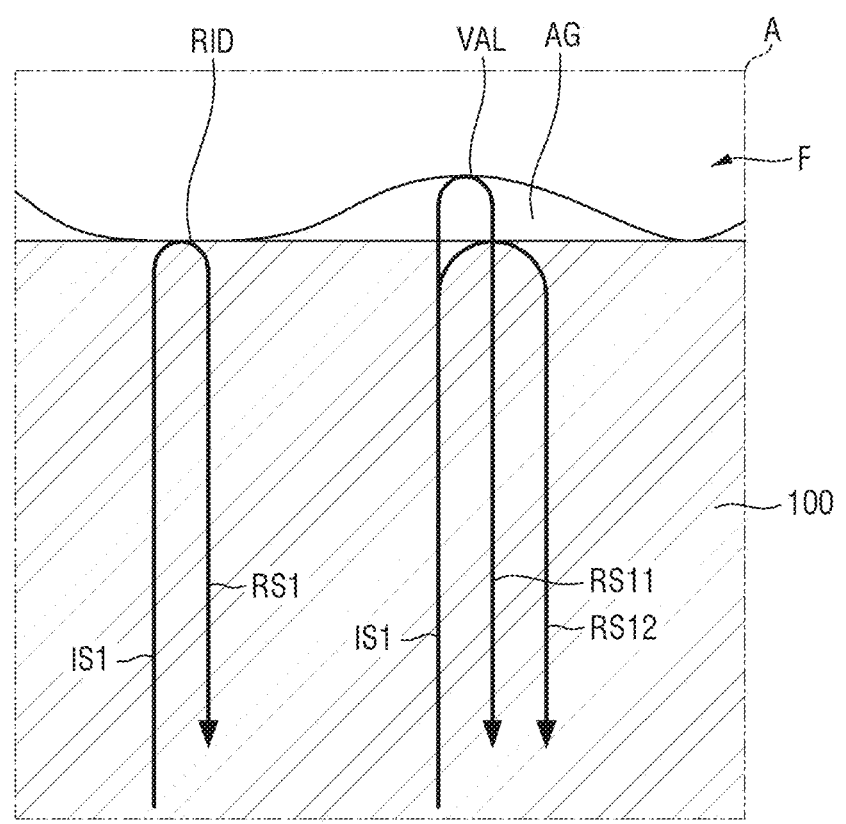
FIG. 8 is an enlarged cross-sectional view of area A of FIG. 6.

FIG. 8 is an enlarged cross-sectional view of area A of FIG. 6.

Referring to FIGS. 6 and 8, a first ultrasonic wave IS1 is transmitted toward ridges RID and valleys VAL of the fingerprint, and then is reflected off the ridges RID and the valleys VAL. The first ultrasonic wave IS1 transmitted toward the ridges RID may travel through (e.g., traverse) the fifth coupling member AM5, the second metal plate LP2, the fourth coupling member AM4, the protective layer PF, the third coupling member AM3, the display panel 300, the first coupling member AM1, the polarization layer POL, the second coupling member AM2 and the cover window 100 to reach the ridges RID. As shown in FIG. 6, since the ridges RID are in direct contact with the cover window 100, there may be no gap, for example, no air gap AG, between the ridges RID and the cover window 100.

The first ultrasonic wave IS1 transmitted toward the valleys VAL may traverse the fifth coupling member AM5, the second metal plate LP2, the fourth coupling member AM4, the protective layer PF, the third coupling member AM3, the display panel 300, the first coupling member AM1, the polarization layer POL, the second coupling member AM2, the cover window 100 and an air gap AG to reach the valleys VAL. The first ultrasonic wave IS1 transmitted toward the valleys VAL may further traverse the air gap AG compared to the first ultrasonic wave IS1 transmitted toward the ridges RID. Among the first ultrasonic waves IS1 generated from the ultrasonic fingerprint sensor 400, the first ultrasonic wave IS1 transmitted toward the ridges RID may be converted into a first signal RS1 reflected from the ridges RID, while the first ultrasonic wave IS1 transmitted toward the valleys VAL may be converted into a first signal RS1 (e.g., a split signal) that includes a first reflected signal RS11 reflected from the interface between the air gap AG and the cover window 100 and a second reflected signal RS12 reflected from the valleys VAL. The intensity of the first reflected signal RS11 may be greater than the intensity of the second reflected signal RS12.

The fingerprint sensor 400 can recognize the ridges RID and valleys VAL based on a first time difference between the time point at which the first ultrasonic wave IS1 is generated and the time point at which the first signal RS1 reflected from the ridges RID arrives, and a second time difference between the time point at which the first ultrasonic wave IS1 is generated and the time point at which the first signal RS1 reflected at the valleys VAL and at the interface between the air gap AG and the cover window 100 arrives. However, since the air gap AG is located between the valleys VAL and the cover window 100, and because ultrasonic waves travel at different speeds through different mediums, it may not be easy to distinguish between the ridges RID and the valleys VAL based on the first time difference and the second time difference.

In view of the above, in order to better distinguish between the ridges RID and the valleys VAL in consideration of the air gap AG between the valleys VAL and the cover window 100, a method of calculating a ratio between the intensity of the first ultrasonic wave IS1 and the intensity of the first signal RS1 to distinguish between the ridges RID and the valleys VAL may be used. The ratio between the intensity of the first ultrasonic wave IS1 and the intensity of the first signal RS1 is defined as a reflection coefficient (R). More specifically, the reflection coefficient of the first ultrasonic wave IS1 generated toward the valleys VAL may be greater than the reflection coefficient of the first ultrasonic wave IS1 generated toward the ridges RID. It is possible to distinguish between the ridges RID and the valleys VAL based on the reflection coefficients of the first ultrasonic waves IS1.

Hereinafter, a method for restoring an image of a fingerprint sensor according to an example embodiment will be described in more detail with reference to FIGS. 1 and 9 to 12.

Figure 9:
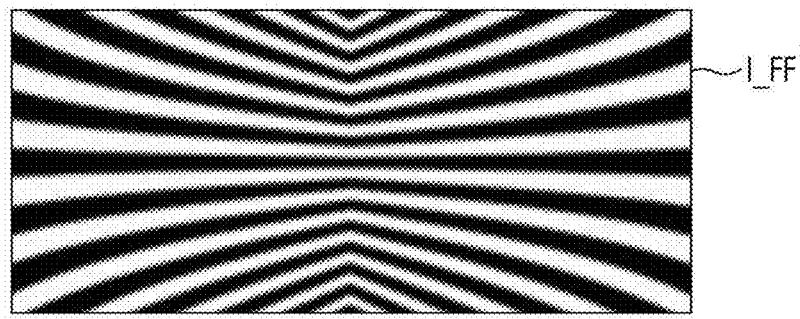
FIG. 9 is a view that shows a fake fingerprint image of the method for restoring an image of the fingerprint sensor according to FIG. 1.
Figure 10:
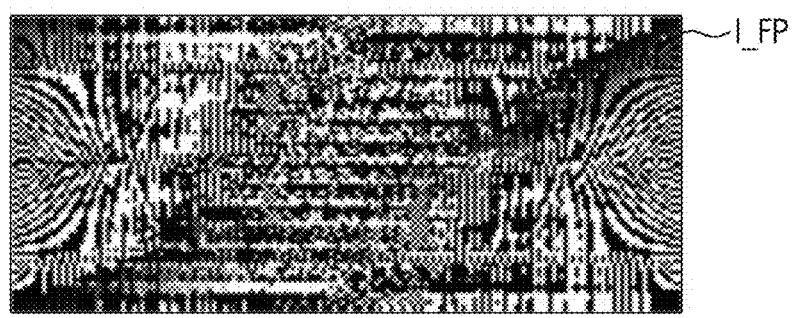
FIG. 10 is a view that shows the calculation of a phase of the fake fingerprint image of FIG. 9.
Figure 11:
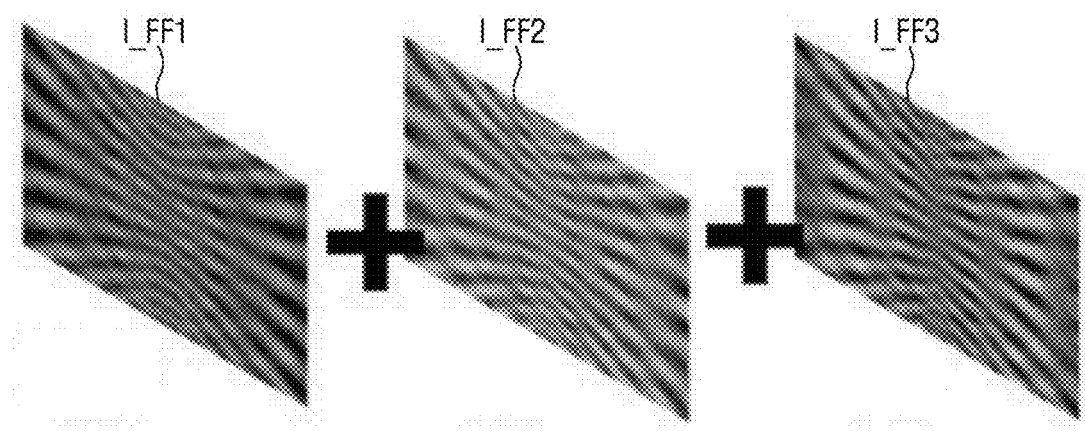
FIG. 11 is a view that shows target fingerprint images to which a calculated phase of target fingerprint images captured at measurement times acquired according to FIG. 10 is applied, and a synthesis of the target fingerprint images.
Figures 12, 13:
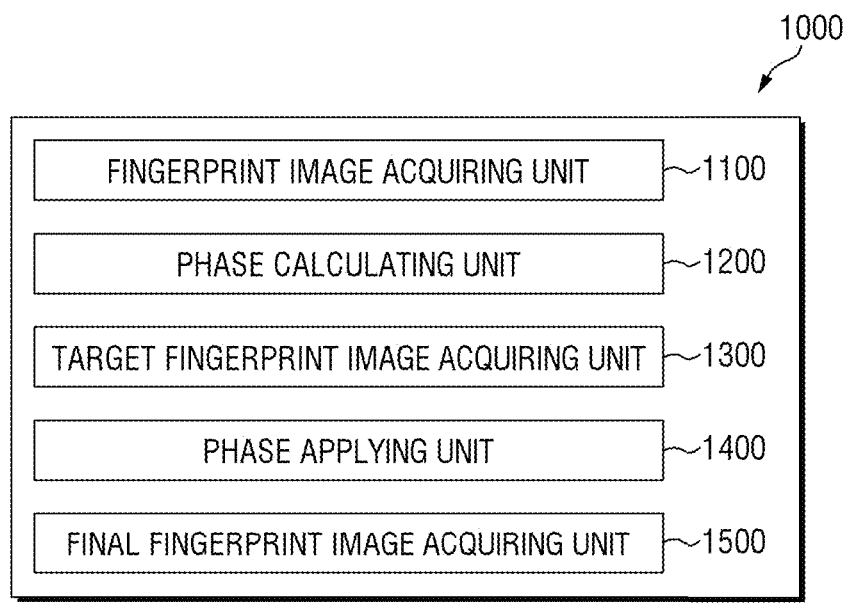
FIG. 12 is a table that shows a synthesis order of the method for restoring an image of the fingerprint sensor according to FIG. 1.
FIG. 13 is a block diagram that illustrates an apparatus for restoring an image of a fingerprint sensor according to an example embodiment of the present disclosure.

FIG. 9 is a view that shows a fake fingerprint image of the method for restoring an image of the fingerprint sensor according to FIG. 1. FIG. 10 is a view that shows the calculation of a phase of the fake fingerprint image of FIG. 9. FIG. 11 is a view that shows target fingerprint images to which a calculated phase of target fingerprint images at measurement times acquired according to FIG. 10 is applied, and a synthesis of the target fingerprint images. FIG. 12 is a table that shows a synthesis order of the method for restoring an image of the fingerprint sensor according to FIG. 1.

As shown in FIGS. 1 and 9, a fake fingerprint image I_FF is acquired (step S101).

Subsequently, as shown in FIGS. 1 and 7, a phase I_FP of the fake fingerprint image I_FF of FIG. 9 is calculated (step S2). The phase I_FP of the fake fingerprint image I_FF may include information on the ridges RID and the valleys VAL of the fake fingerprint image I_FF. For example, by calculating the phase I_FP of the fake fingerprint image I_FF, it is possible to acquire the information on the ridges RID and the valleys VAL of the fake fingerprint image I_FF. The fake fingerprint image I_FF may be captured on the same ultrasonic fingerprint sensor and the same stack structure of the display device that acquires the target fingerprint images, which will be described later.

Specifically, the fake fingerprint image I_FF is acquired on the same ultrasonic fingerprint sensor and the same stack structure of the display device stacked structure that acquires the target fingerprint images. Therefore, the calculated phase I_FP of the fake fingerprint image I_FF contains information on the stack structure of the display device. By applying the calculated phase I_FP of the fake fingerprint image I_FF to the target fingerprint images, which will be described later, it is possible to correct the phase of the target fingerprint images.

Subsequently, with reference to FIGS. 1, 8 and 11, the fingerprint sensor disposed on the rear side of the display panel 300 acquires the target fingerprint images at predetermined measurement times. The calculated phase from the prior captured fake fingerprint contains phase information based on the stack structure of the display device, and by applying this phase information to target fingerprint images, the phase shifts of the transmitted and reflected signals due to the structure of the device may be corrected. Accordingly, the calculated phase is applied to each of the acquired target fingerprint images (step S3). Finally, a final fingerprint image is obtained from the target fingerprint images I_FF1, I_FF2 and I_FF3.

As shown in FIG. 11, the obtaining of the final fingerprint image from the target fingerprint images I_FF1, I_FF2 and I_FF3 to each of which the calculated phase has been applied (step S5) may include synthesizing the target fingerprint images I_FF1, I_FF2 and I_FF3. By synthesizing the target fingerprint images I_FF1, I_FF2 and I_FF3 to each of which the calculated phase has been applied, the magnitudes of the target fingerprint images I_FF1, I_FF2 and I_FF3 may be added up. Herein, the magnitude of each of the target fingerprint images I_FF1, I_FF2 and I_FF3 may include distance information spanning the entire fingerprint area including the ridges and valleys and the ultrasonic fingerprint sensor.

In some example embodiments, the obtaining of the final fingerprint image from the target fingerprint images I_FF1, I_FF2 and I_FF3 (step S5) may include obtaining the average of the magnitudes of the target fingerprint images I_FF1, I_FF2 and I_FF3.

In some example embodiments, the obtaining the final fingerprint image from the target fingerprint images I_FF1, I_FF2 and I_FF3 (step S5) may include complementing the magnitudes of the target fingerprint images I_FF1, I_FF2 and I_FF3. For example, if a part of the first target fingerprint image I_FF1 is unclear and the corresponding part of the second or third target fingerprint image I_FF2 or IFF3 is clear, the part of the first target fingerprint image I_FF1 may be substituted with the corresponding part of the second or third target fingerprint image I_FF2 or IFF3, so that magnitude can be complemented. As a result, the entire area of the final fingerprint image can include clear magnitude information.

In the synthesis of the target fingerprint images I_FF1, I_FF2 and I_FF3 (five target fingerprint images are illustrated in Table of FIG. 12), the target fingerprint images may be measured at a regular interval or an irregular interval.

Hereinafter, an apparatus for restoring an image of a fingerprint sensor according to an example embodiment of the present disclosure will be described with reference to FIG. 13.

FIG. 13 is a block diagram that illustrates an apparatus for restoring an image of a fingerprint sensor according to an example embodiment of the present disclosure.

Referring to FIG. 13, an apparatus for restoring an image of a fingerprint sensor according to an example embodiment of the present disclosure may include: an image acquiring unit 1100 that acquires (e.g., captures) a fake fingerprint image; a phase calculating unit 1200 that calculates a phase of the fake fingerprint through the acquired fake fingerprint image; a target fingerprint image acquiring unit 1300 that acquires target fingerprint images at measurement times through a fingerprint sensor disposed on a rear side of a display panel; and a phase applying unit 1400 that applies a calculated phase to each of the acquired target fingerprint images.

The aforementioned components, such as those mentioned in FIG. 13, may be implemented through hardware, software, or a combination thereof. The image acquiring unit 1100 may include a fingerprint sensor and a coupled circuit configured to process data captured by the fingerprint sensor.

For example, some units may be implemented in memory and executed through a processor operable to execute a set of instructions. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

The fingerprint sensor of the embodiments described herein may include an ultrasonic fingerprint sensor.

The apparatus 1000 for restoring an image of a fingerprint sensor according to an example embodiment of the present disclosure may further include a final fingerprint image acquiring unit 1500 (e.g., a final fingerprint image generator) that generates a final fingerprint image from the target fingerprint images to which each of the calculated phases is applied, after the calculated phase is applied to each of the target fingerprint images by the phase applying unit.

The final fingerprint image acquiring unit 1500 may synthesize the target fingerprint images.

In some example embodiments, the final fingerprint image acquiring unit 1500 may obtain the average of the magnitudes of the target fingerprint images.

In some other example embodiments, the final fingerprint image acquiring unit 1500 may complement the average of the magnitudes of the target fingerprint images.

Although embodiments of the invention have been disclosed for illustrative purposes, those skilled in the art will appreciate that various modifications, additions and substitutions may be made to these embodiments without departing from the scope and spirit of the invention as disclosed in the accompanying claims.

What is claimed is:

1. A method for restoring an image of a fingerprint sensor, the method comprising:
    capturing, by the fingerprint sensor, a fake fingerprint image from a fake fingerprint;
    calculating a phase of the fake fingerprint from the fake fingerprint image;
    capturing a plurality of target fingerprint images at measurement times by a fingerprint sensor disposed on a rear side of a display panel;
    applying the calculated phase to each of the plurality of acquired target fingerprint images; and
    combining information from each of the plurality of target fingerprint images to generate a final fingerprint image.

2. The method of claim 1, wherein the fingerprint sensor comprises an ultrasonic fingerprint sensor.

3. The method of claim 2, wherein in the capturing of the plurality of target fingerprint images, a polarization layer is further included on the display panel, and a first coupling member between the polarization layer and the display panel is further included.

4. The method of claim 3, wherein in the capturing of the plurality of target fingerprint images, a cover window is further included on the polarization layer; and a second coupling member between the cover window and the polarization layer is further included.

5. The method of claim 4, wherein in the capturing of the plurality of target fingerprint images, a protective layer between the display panel and the fingerprint sensor is further included, and a third coupling member between the polarization layer and the display panel is further included.

6. The method of claim 5, wherein in the capturing of the plurality of target fingerprint images, a metal plate between the protective layer and the fingerprint sensor is further included, and a fourth coupling member between the metal plate and the protective layer is further included.

7. The method of claim 2, wherein the ultrasonic fingerprint sensor compares an transmitted ultrasonic wave incident upward from the ultrasonic fingerprint sensor with a fingerprint ultrasonic wave reflected from a fingerprint to recognize the fingerprint.

8. The method of claim 1, wherein
    applying the calculated phase to each of the plurality of acquired target fingerprint images corrects a phase of each of the plurality of target fingerprint images.

9. The method of claim 8, wherein the applying the calculated phase to each of the plurality of acquired target fingerprint images comprises: synthesizing magnitudes of the target fingerprint images.

10. The method of claim 8, wherein the combining information from each of the plurality of target fingerprint images comprises: obtaining an average of the target fingerprint images.

11. The method of claim 8, wherein the applying the calculated phase to each of the plurality of target fingerprint images comprises: complementing magnitudes of the target fingerprint images.

12. The method of claim 1, wherein the measurement times are spaced at a regular interval.

13. The method of claim 1, wherein the measurement times are spaced at an irregular interval.

14. An apparatus for restoring an image of a fingerprint sensor, comprising:
    an image acquiring unit configured to capture a fake fingerprint image from a fake fingerprint;
    a phase calculating unit configured to calculate a phase of the fake fingerprint from the fake fingerprint image;
    a target fingerprint image acquiring unit configured to capture target fingerprint images at measurement times by a fingerprint sensor disposed on a rear side of a display panel; and
    a phase applying unit configured to apply the calculated phase to each of the acquired target fingerprint images.

15. The apparatus of claim 14, wherein the fingerprint sensor comprises an ultrasonic fingerprint sensor.

16. The apparatus of claim 14, further comprising:
a final fingerprint image generator, configured to generate a final fingerprint image from the target fingerprint images after the calculated phase is applied to each of the acquired target fingerprint images.

17. The apparatus of claim 16, wherein the final fingerprint image generator synthesizes the target fingerprint images.

18. The apparatus of claim 16, wherein the final fingerprint image generator obtains an average of magnitudes of the target fingerprint images.

19. The apparatus of claim 16, wherein the final fingerprint image generator complements magnitudes of the target fingerprint images.

20. The apparatus of claim 14, wherein the measurement times of the capturing of the target fingerprint images are spaced at a regular interval by the target fingerprint image acquiring unit.

\* \* \* \* \*